(12) United States Patent
Johnston et al.

(10) Patent No.: US 11,703,305 B2
(45) Date of Patent: Jul. 18, 2023

(54) ALIGNMENT RING FOR SCOPE

(71) Applicant: Crimson Trace Corporation, Columbia, MO (US)

(72) Inventors: William Johnston, Tualatin, OR (US); Jason Clark, Beaverton, OR (US); Eric Petterson, Beaverton, OR (US); Eric David Marvin, Wilsonville, OR (US)

(73) Assignee: CRIMSON TRACE CORPORATION, Columbia, MO (US)

( * ) Notice: Subject to any disclaimer, the term of this patent is extended or adjusted under 35 U.S.C. 154(b) by 0 days.

(21) Appl. No.: 17/809,388

(22) Filed: Jun. 28, 2022

(65) Prior Publication Data

US 2022/0349674 A1    Nov. 3, 2022

Related U.S. Application Data

(63) Continuation of application No. 17/113,415, filed on Dec. 7, 2020, now Pat. No. 11,391,543, which is a continuation of application No. 16/586,438, filed on Sep. 27, 2019, now Pat. No. 10,859,345.

(60) Provisional application No. 62/739,126, filed on Sep. 28, 2018.

(51) Int. Cl.
*F41G 1/38*        (2006.01)
*G02B 25/00*       (2006.01)

(52) U.S. Cl.
CPC ............. *F41G 1/38* (2013.01); *G02B 25/001* (2013.01)

(58) Field of Classification Search
CPC ................. F41G 1/38; F41G 1/42; F41G 1/44

USPC ............................................ 42/144, 119, 111
See application file for complete search history.

(56) References Cited

U.S. PATENT DOCUMENTS

| | | |
|---|---|---|
| 3,777,404 A | 12/1973 | Oreck |
| 4,375,725 A | 3/1983 | Orlob |
| 4,745,698 A | 5/1988 | Schwulst |
| 4,850,113 A | 7/1989 | Doll |
| 6,032,374 A | 3/2000 | Sammut |
| 6,557,291 B2 | 5/2003 | Hoadley |
| 6,681,512 B2 | 1/2004 | Sammut |
| 7,100,320 B2 | 9/2006 | Verdugo |
| 7,185,455 B2 | 3/2007 | Zaderey |
| D542,879 S | 5/2007 | Zaderey |
| 7,530,193 B2 | 5/2009 | Williamson, IV et al. |
| 3,064,132 A1 | 11/2011 | LeBlanc |
| D679,776 S | 4/2013 | Bracken et al. |
| D684,617 S | 6/2013 | Romero |
| 8,578,646 B2 | 11/2013 | Joannes |

(Continued)

FOREIGN PATENT DOCUMENTS

| | | |
|---|---|---|
| DE | 3326464 A2 | 1/1985 |
| GB | 2433606 A | 6/2007 |
| WO | 99/27408 | 6/1999 |

*Primary Examiner* — Reginald S Tillman, Jr.
(74) *Attorney, Agent, or Firm* — Stinson LLP

(57) ABSTRACT

Disclosed herein are alignment features for scopes, such as alignment rings for telescopic sights. For example, a scope can includes a proximal end having an interior surface. The proximal end is that which a user aligns his or her eye in order to visualize a target. The scope may also include an alignment ring on the interior surface of the proximal end. The alignment ring assists a user in determining whether his or her eye is properly aligned with a longitudinal axis of the scope. With correct eye alignment, the alignment ring is not visible. With incorrect eye alignment, at least a portion of the alignment ring is visible, thus ensuring accurate sighting.

20 Claims, 2 Drawing Sheets

(56) References Cited

U.S. PATENT DOCUMENTS

| | | |
|---|---|---|
| D700,944 S | 3/2014 | Mikroulis |
| D700,945 S | 3/2014 | Mikroulis |
| D706,328 S | 6/2014 | Romero |
| D716,409 S | 10/2014 | Mikroulis |
| D716,905 S | 11/2014 | Beckett et al. |
| D720,033 S | 12/2014 | Mikroulis |
| 8,910,412 B2 | 12/2014 | Mikroulis |
| 8,915,008 B2 | 12/2014 | Mauricio et al. |
| D726,280 S | 4/2015 | Mikroulis |
| 9,010,012 B2 | 4/2015 | Matthews et al. |
| D758,523 S | 6/2016 | Mikroulis |
| D767,077 S | 9/2016 | Mikroulis |
| D767,659 S | 9/2016 | Mikroulis |
| D767,660 S | 9/2016 | Mikroulis |
| D768,221 S | 10/2016 | Mikroulis |
| 9,593,908 B2 | 3/2017 | Hancosky |
| 9,759,519 B2 | 9/2017 | Hancosky |
| D814,601 S | 4/2018 | Hamilton et al. |
| D824,480 S | 7/2018 | Izumi |
| 10,113,835 B1 | 10/2018 | Stephenson |
| D834,629 S | 11/2018 | Mikroulis |
| 10,132,594 B2 | 11/2018 | Chou |
| D850,562 S | 6/2019 | Mikroulis |
| D850,563 S | 6/2019 | Mikroulis |
| D850,566 S | 6/2019 | Mikroulis |
| D865,112 S | 10/2019 | Mikroulis |
| D865,113 S | 10/2019 | Mikroulis |
| D865,114 S | 10/2019 | Mikroulis |
| D865,115 S | 10/2019 | Mikroulis |
| 10,514,233 B2 | 12/2019 | Sun et al. |
| D882,018 S | 4/2020 | Hamilton et al. |
| 10,859,345 B2 | 12/2020 | Johnston et al. |
| 2004/0201886 A1 | 10/2004 | Skinner et al. |
| 2019/0301834 A1 | 10/2019 | Hamilton et al. |
| 2019/0376766 A1 | 12/2019 | Fruechtel |
| 2020/0025518 A1 | 1/2020 | Nackel et al. |
| 2020/0271419 A1 | 8/2020 | Grace |

ALIGNMENT RING FOR SCOPE

CROSS REFERENCE TO RELATED APPLICATIONS

This application claims priority to U.S. application Ser. No. 17/113,415, filed Dec. 7, 2020, which claims priority to U.S. application Ser. No. 16/586,438, filed Sep. 27, 2019, now U.S. Pat. No. 10,859,345, which claims the benefit of U.S. Provisional Application No. 62/739,126 filed Sep. 28, 2018, the entireties of which are hereby incorporated by reference.

TECHNICAL FIELD

This disclosure relates to optical sighting devices, and in particular, to telescopic rifle scopes.

BACKGROUND

A telescopic sight, commonly called a scope, is an optical sighting device that is based on a refracting telescope. Scopes often are equipped with some form of graphic image pattern, such as a reticle, that is positioned in an optically appropriate position in the scope's optical system to provide the user with an accurate aiming point. Telescopic sights are used in all types of environments that require accurate aiming, but are most commonly found on firearms, particularly rifles.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
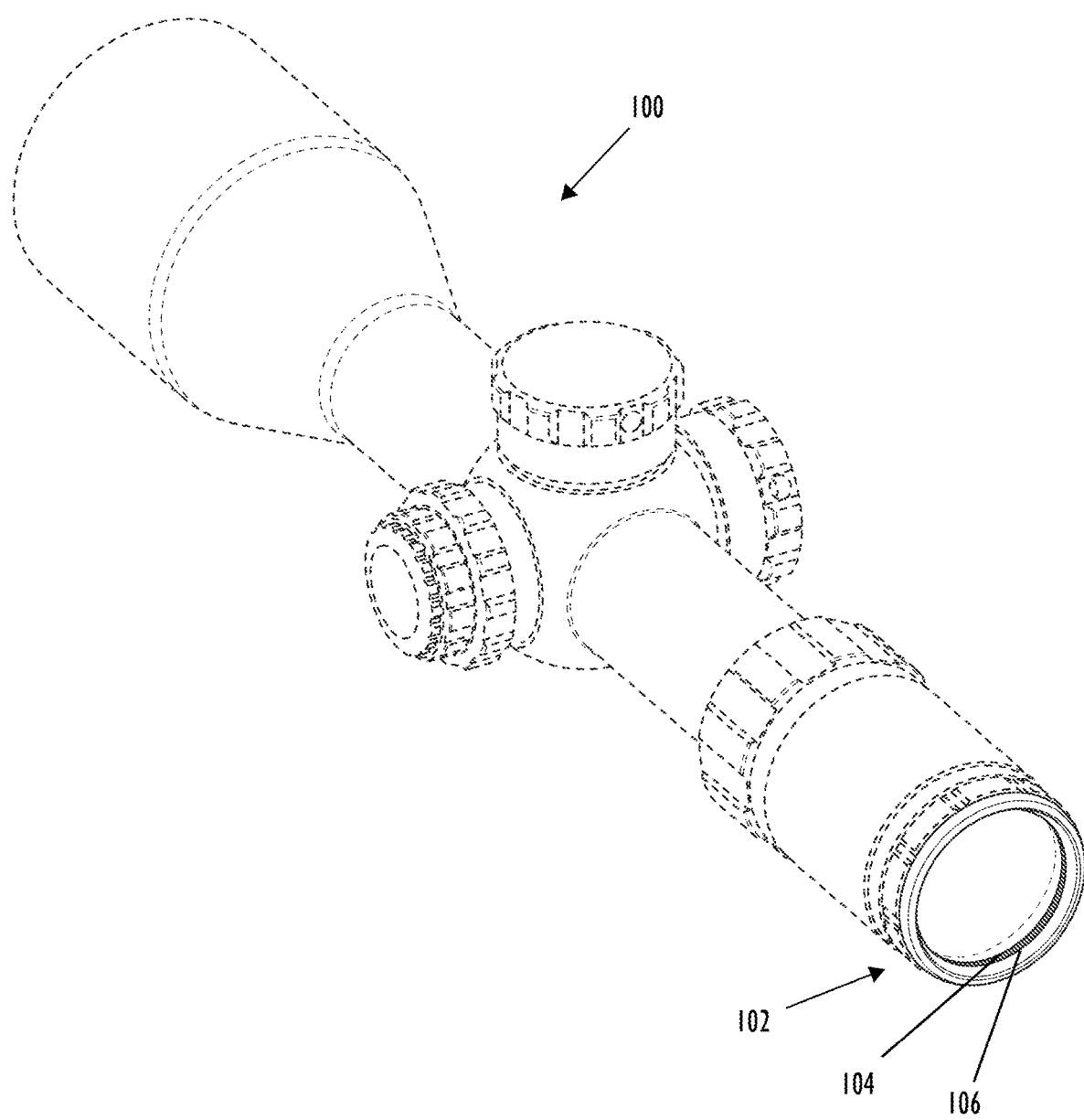
FIG. 1 is a perspective view of a scope, illustrating an alignment ring that is visually apparent to a user when the user's viewing angle is not correctly aligned with the longitudinal axis of the scope.

The patent or application file contains at least one drawing executed in color. Copies of this patent or patent application publication with color drawing(s) will be provided by the Office upon request and payment of the necessary fee.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

As used herein, the singular forms "a," "an," and "the" are intended to include the plural forms as well, unless the context clearly indicates otherwise.

As used herein, the term "and/or" refers to and encompasses any and all possible combinations of one or more of the associated listed items, as well as the lack of combinations when interpreted in the alternative ("or").

As used herein, "one or more" or at least one can mean one, two, three, four, five, six, seven, eight, nine, ten or more, up to any number.

As used herein, the term "comprises" or "comprising" mean "includes." Hence "comprising A or B" means including A, B, or A and B. "Comprise" and variations of the term, such as "comprising", "comprises" and "comprised", as used herein, mean that various additional components or steps can be conjointly employed.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments herein provide alignment features for optical sighting devices, such as telescopic rifle scopes, including, but not limited to, commercially available Crimson Trace Scopes as available on the world wide web products.crimsontrace.com/lasers/scope as of Sep. 25, 2019, such as CSA-2524 2-Series Sport Riflescope, CTL-3525 3-Series Tactical Riflescope, CTL-5324 5-Series Tactical Riflescope, CTL-5324-02 5-Series Tactical Riflescope. FIG. 1 is a perspective view of a scope, illustrating an alignment ring that is visually apparent to a user when the user's viewing angle is not correctly aligned with the longitudinal axis of the scope, in accordance with various embodiments. As illustrated in FIG. 1, a scope 100 may have a proximal end 102, with which a user aligns his or her eye in order to visualize a target. Accurate target visualization requires the user to precisely align his or her eye with the longitudinal axis of the scope. For example, if the user's eye is misaligned with the longitudinal axis by deviation to the left, right, top, bottom, etc., the accuracy of target sighting may be compromised. In some environments, it may be difficult to detect this misalignment.

In various embodiments, an alignment ring 104 may be provided to help a user determine whether his or her eye is properly aligned with the longitudinal axis of the scope, thus ensuring accurate sighting. The alignment ring 104 may have a distinctive color that is visually apparent to the user. For example, the alignment ring 104 may be red, yellow, blue, orange, silver, white, etc. against a darker background color of the scope 100 interior. In some embodiments, the color of the scope 100 interior may be black, gray, flat dark earth (FDE), gun metal gray, green, brown, camouflage, or the like. In some embodiments, the alignment ring 104 may be a continuous ring, whereas in other embodiment it may be a broken line or series of dots arranged in a circular ring pattern about the interior surface of the proximal end 102 of the scope 100. In some embodiment, the alignment ring may be iridescent or fluorescent, or may have any other characteristic that makes it visually apparent to the user.

In various embodiments, the alignment ring 104 may be recessed slightly, such as less than 0.015 inches, such as between 0.005-0.015 inches, behind a ridge, lip, or annular projection 106 such that all or a portion of the alignment ring 104 is visible to a user when the user's eye is not aligned with the longitudinal axis of the scope. As such, the alignment ring 104 may be visible to a user only when his or her eye is out of alignment with the longitudinal axis of the scope. Thus, the appearance of the alignment ring 104 may serve to alert the user that his or her eye is not aligned with the scope 100, and that aiming accuracy may be compromised. Additionally, the position of the portion of the alignment ring 104 that is visible to the user may serve as an indicator of the direction of the misalignment. For example, if a portion of the alignment ring 104 is visible on the left side of the user's field of view, a user will intuitively know to move his or her head to the left, toward the visible portion of the alignment ring 104 to correct the alignment issue.

Figure 2:
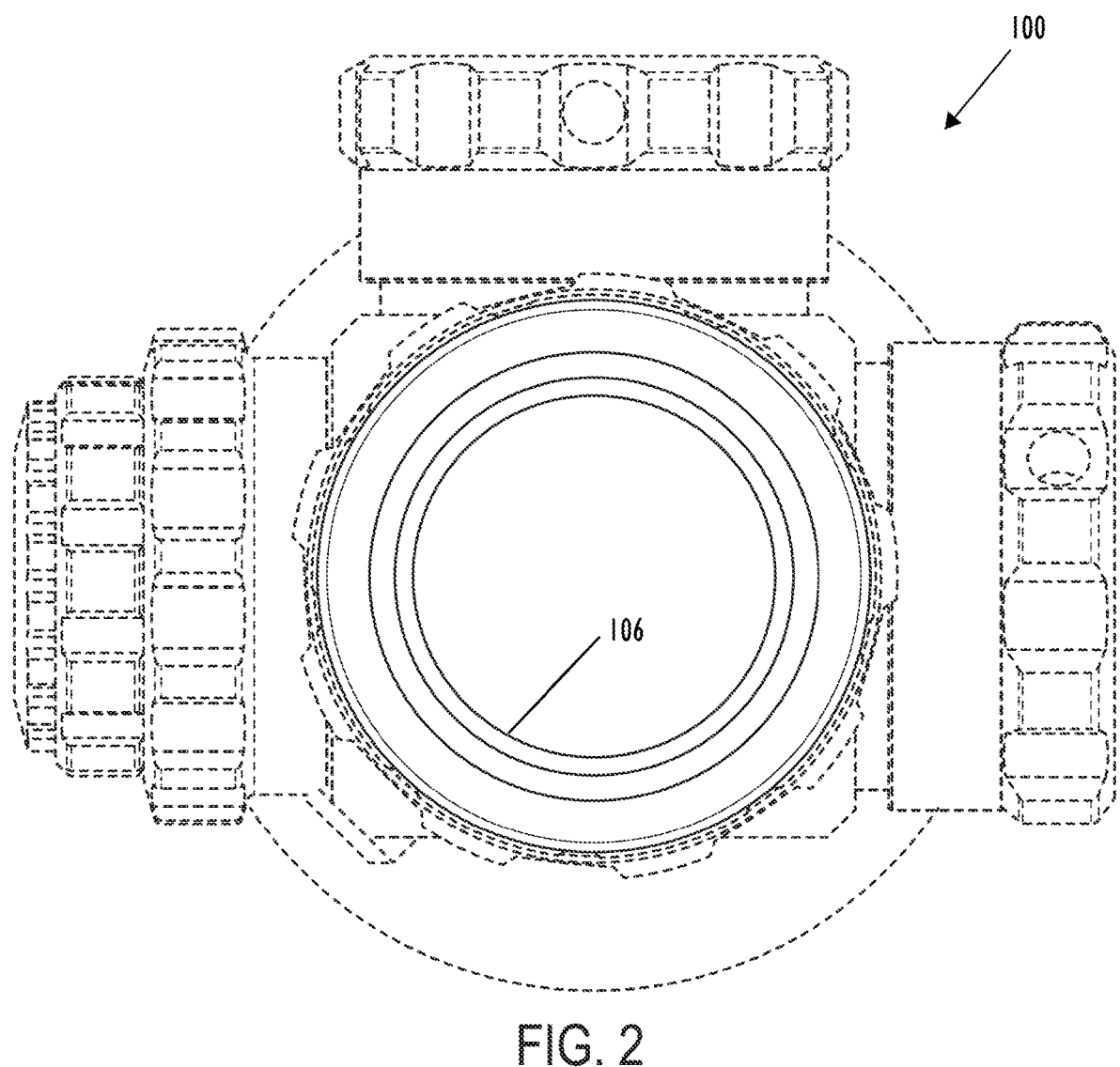
FIG. 2 is an end view of the scope, illustrating that the alignment ring disappears when the user's viewing angle is correctly aligned with the longitudinal axis of the scope, in accordance with various embodiments.

FIG. 2 is an end view of the scope, illustrating that the alignment ring disappears when the user's viewing angle is correctly aligned with the longitudinal axis of the scope, in accordance with various embodiments. Turning now to FIG. 2, the alignment ring (not visible) may be obscured by the ridge, lip, or annular projection 106 such that no portion of the alignment ring is visible. Disappearance of the alignment ring 104 may thus indicate that the user's eye is correctly positioned with respect to the longitudinal axis of the scope 100.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

We claim:

1. An optical sighting device for assisting a user's eye in sighting a target with a firearm, the optical sighting device comprising:
    a sight body having a proximal end configured to face the user, a distal end distal of the proximal end, and a longitudinal axis extending between the proximal and distal ends, the sight body including an inner surface bounding a field of view through which the user can visualize the target;
    an alignment indicator arranged to assist the user in determining whether his or her eye is correctly aligned with the longitudinal axis of the sight body, the alignment indicator being disposed laterally outward of the inner surface, the alignment indicator being arranged relative to the inner surface such that the alignment indicator is not visible by the user's eye when the user's eye is in a correct eye alignment with respect to the longitudinal axis of the sight body, and the alignment indicator being arranged relative to the inner surface such that the alignment indicator is visible by the user's eye when the user's eye is in an incorrect eye alignment with respect to the longitudinal axis of the sight body.

2. The optical sighting device of claim 1, wherein the alignment indicator is disposed radially outward of the inner surface.

3. The optical sighting device of claim 2, wherein the alignment indicator is entirely disposed radially outward of the inner surface.

4. The optical sighting device of claim 1, wherein the alignment indicator is recessed distally behind the inner surface.

5. The optical sighting device of claim 4, wherein the alignment indicator is recessed distally behind the inner surface by an amount that is equal to or less than 0.015 inches.

6. The optical sighting device of claim 5, wherein the amount is within the inclusive range of 0.005 inches to 0.015 inches.

7. The optical sighting device of claim 1, wherein the alignment indicator is disposed distally of the inner surface.

8. The optical sighting device of claim 7, wherein the sight body includes a lens configured to face the user, wherein the alignment indicator spaced apart from the lens.

9. The optical sighting device of claim 8, wherein the lens is a most-proximally disposed lens, wherein the alignment indicator is disposed proximally of the lens.

10. The optical sighting device of claim 1, wherein the alignment indicator comprises an alignment ring.

11. The optical sighting device of claim 10, wherein the alignment ring is a continuous ring.

12. The optical sighting device of claim 1, wherein the alignment indicator is colored to contrast with a color of the sight body.

13. The optical sighting device of claim 1, wherein the alignment indicator is red.

14. The optical sighting device of claim 1, wherein the alignment indicator comprises a plurality of alignment indicators.

15. The optical sighting device of claim 6, wherein the alignment indicators comprise dashes of a broken line or a series of dots.

16. The optical sighting device of claim 1, wherein the alignment indicator is a physical structure disposed on the proximal end.

17. The optical sighting device of claim 16, wherein the proximal end has an interior surface, the alignment indicator being disposed on the interior surface.

18. The optical sighting device of claim 1, wherein the alignment indicator is arranged relative to the sight body to be blocked from view by the user's eye by the sight body when the user's eye is in the correct eye alignment.

19. The optical sighting device of claim 18, wherein the sight body includes an annular projection, the annular projection defining the inner surface, the annular projection arranged relative to the alignment indicator to block the alignment indicator from view by the user's eye when the user's eye is in the correct eye alignment.

20. The optical sighting device of claim 1, wherein the optical sighting device is a telescopic sight.

\* \* \* \* \*